United States Patent [19]

Berger

[11] Patent Number: 4,935,035

[45] Date of Patent: Jun. 19, 1990

[54] PROCESS OF PRODUCING DRIED WOOD CHIPS

[75] Inventor: Josef Berger, Raab, Austria

[73] Assignee: Helmut Kloimstein, Linz, Austria; a part interset

[21] Appl. No.: 268,898

[22] Filed: Nov. 8, 1988

[30] Foreign Application Priority Data

Nov. 11, 1987 [AT] Austria .................................. 2977/87

[51] Int. Cl.$^5$ ............................................... C10L 5/00
[52] U.S. Cl. ......................................... 44/606; 44/590
[58] Field of Search .................. 44/589, 590, 605, 606

[56] References Cited

U.S. PATENT DOCUMENTS 4,043,764  8/1977  Loas ...................................... 44/589

FOREIGN PATENT DOCUMENTS 3211590 10/1983  Fed. Rep. of Germany ........ 44/606
3232239  3/1984  Fed. Rep. of Germany ........ 44/590
8103029 10/1981  World Int. Prop. O. ............ 44/589
8302779  8/1983  World Int. Prop. O. ............ 44/589

*Primary Examiner*—Carl F. Dees
*Attorney, Agent, or Firm*—Kurt Kelman

[57] ABSTRACT

Wood from broad-leaved and/or coniferous woody plants, particularly bushwood or waste wood or wood obtained in wood-growing plantations, is processed in that wood in a green state is chopped to form wood chips and is mixed with accompanying or additional fermentable green plant material, which has also been comminuted. The resulting mixture is compacted to form a compacted body of plant material in a space which is airtightly enclosed at least on the sides and at the bottom. The compacted body is fermented in said space to generate heat of fermentation, which is used to dry the compacted body so that water vapor and gases are evolved, which are permitted to escape. The fermentable green plant material may consist of the bark and leaves of broad-leaved woody plants, of the leaves of leaved plants, of grass, or of mixtures of said materials.

14 Claims, 1 Drawing Sheet

PROCESS OF PRODUCING DRIED WOOD CHIPS

BACKGROUND OF THE INVENTION

1. Field of the Invention

This invention relates to a process of producing dried wood chips made of the wood of broad-leaved and/or coniferous woody plants, particularly of wood from bushes and of waste wood or of wood obtained in wood-growing plantations.

2. Description of the Prior Art

Wood chips are used at increasing rates for heating purposes. Their heating value will strongly depend on the dryness of the wood chips. An adequate drying to a moisture content of 16 to 20% by weight will also be required to ensure that a sooting of the chimneys and an intolerable pollution of the environment by the flue gases from excessively moist wood chips will be avoided.

It is known that wood, particularly waste wood, can be predried in the air, but large drying areas are required, before the wood is chopped and the chips must be subsequently dried to the desired moisture content in drying plants heated by extraneous heat. But the chopping of predried wood is more difficult than the chopping of green wood. Predrying involves the performance of a plurality of operations between the supply of the wood and the chopping operation. Besides, storage times are required for drying and the final drying requires an expenditure of work, time and energy. Whereas a strong predrying will decrease the energy required for the final drying, the predried wood chips will be liable to be infested by pests or fungi when they are kept in intermediate storage under improper or unfavorable conditions and an undesirably high proportion of dust and fine particles may be formed in the chipped material and may even have to be removed for a production of wood chips which can be used in heating plants. Difficulties are involved in the dumping of the separated fines. In a search for alternative cultivation methods in agriculture, so-called wood-growing plantations have become significant, in which fast-growing woody plants, such as poplars, alders, willows and various species of Hibiscus, are grown in most cases as multiple-stem bushes. In some cases a trunk may be left in the ground and only the stems which have off-shooted from the trunk may be cropped so that a plurality of harvests are possible in a multi-annual cycle without a need for a new planting. If the wood that has been cropped in such wood-growing plantations is to be used for the production of wood chips for fuel-firing furnaces, an economical utilization by which the costs are recovered or which is profitable is apparently impossible unless the wood chips produced can be dried without a need for extraneous energy. A large proportion of waste wood will also be contained in wood that has been broken by the wind or the snow and which must be processed as soon as possible in order to avoid an infestation by pests.

SUMMARY OF THE INVENTION

It is an object of the invention to provide a process for the production of sufficiently dry wood chips with a low expenditure of work, substantially without a need of intermediate storage and without the use of extraneous energy or with only a small amount of extraneous energy.

In a process of the kind described first hereinbefore that object is accomplished in that the wood in a green state is chopped to form chips, which are then mixed with also comminuted, fermentable green plant material, which consists of the bark and the leaves of broad-leaved woody plants, the leaves of leaved plants, or of grass or of mixtures thereof, and the resulting mixture is compacted to form a compacted body, which is caused to ferment with generation of heat of fermentation in a space that is air-tightly enclosed on all sides and at the bottom, said compacted body is dried in said space under the action of said heat of fermentation, and water vapor and gases evolved during said fermenting and drying are removed from said space.

It had been believed before that wood chips can be stored in bins only in dry state because experience had shown that semimoist or merely predried wood chips stored in bins tend to be infested by fungi or mold so that they may rot in extreme cases and even when only slightly infested by fungi can no longer be combusted for heating purposes at all or can be used for such purposes only with great restrictions and certainly cannot be sold to customers as fuel.

The invention is based on the surprising recognition that at least a major part of the heat required to dry the wood chips can be generated by the fermentation of fermentable green plant material. It has been found that substantially only the fermentable green plant material is fermented and that substantially only the moisture is driven out of the wood. Overheating can be avoided in that the wood and the fermentable green plant material are used in the proper ratio and in that an extraneous cooling is performed, if desired.

If the wood chips are to be made only from the wood of broad-leaved woody plants, the fermentable green plant material may consist of the bark, which has been chopped together with the wood, and of accompanying leaves and the mixture of fermentable green plant material and wood chips may be fermented immediately after the chopping operation. In that case it will be desirable to use the fermentable green plant material in a proportion below 15% by weight and to produce from the wood chips and the fermentable green plant material a mixture having an average moisture content of up to or above 70% by weight. The proportion of the fermentable green plant material may be selected in dependence on the moisture content of the wood chips.

Alternatively, mixtures may be produced, e.g., of green wood chips made of wood of broad-leaved woody plants and wood chips made of wood from green or predried coniferous woody plants. If in such case the wood from the broad-leaved woody plants is not accompanied by a sufficient quantity of fermentable green plant material, additional fermentable green plant material consisting of any or more of the stated substances may be added. It will also be possible to use the process in accordance with the invention for a drying of wood from only coniferous woody plants with the aid of a corresponding quantity of fermentable green plant material. The proportion of the fermentable green plant material will always depend on the average moisture content, on the quantity of heat of fermentation which can be generated by the fermentation of the fermentable green plant material, on the space which is available for carrying out the process and on the heat insulation of such space. If heat at a relatively high rate may be dissipated from the compacted mixture it will be necessary to add somewhat more fermentable green plant material than where heat can be dissipated only at a low rate. The process can be carried out in such a manner that when the fermentation which may result in a temperature rise up to about 80° C. has been terminated and the mixture has subsequently been allowed to cool the completely dried wood chips taken from the drying space have a moisture content of 16 to 20% by weight and can be combusted for heating purposes or can be sold.

If the fermentation is carried out in a space that is defined by heat-insulated bottom and side walls, a sufficient fermentation of the fermentable green plant material and an adequate heating of the wood content for a satisfactory drying will be effected even in the surface layer of the compacted body.

In the drying of large quantities and when the compacted body has a height up to and above 5 meters, exhaust shafts having gas-permeable walls and provided at their top end with an outlet may be disposed in the compacted body so that the gases and water vapor which are evolved can be exhausted through such shafts. A plurality of such shafts may be provided with a spacing of, e.g., 2 meters. In that case the resistance to the exhausting of the gases and water vapor which are evolved will be reduced. An adequate compacting of the mixture can be ensured by trampling or rolling, just as in the ensiling of green forage, in that the wood is chopped to form chips differing in size and having major dimensions between 2 and 35 mm. To dry as fast as possible the compacted body may be formed in an airtightly enclosed space and at least a bottom layer of said body may be formed with a higher proportion of fermentable green plant material or a bottom layer of the compacted body may be formed in a quantity which is only a fractional part of the total quantity of the compacted body and by a supply of energy from an external heat source may be heated to a fermentation temperature above 40° C. immediately when said bottom layer has been formed. In that case the subsequently formed layers of the compacted body will quickly be heated to the fermentation temperature by the heat which has been generated in the bottom layer.

Where relatively large plants are used, two or more fermentation spaces arranged one beside or above the other may be used and may be supplied with the mixture of wood chips and fermentable green plant material during periods of time which are offset from each other and surplus heat of fermentation from a compacted body which is in a state of intense fermentation may be extracted and supplied to the other compacted bodies in order to heat the same to the initial fermentation temperature.

A relatively uniform temperature in the compacted body can be ensured by the above-mentioned insulation of the fermentation space or in that part of the heat of fermentation which has been generated during the drying is dissipated by a heat transfer fluid from the core region of the compacted body to the surface layers of said body. In that case the heat transfer fluid may even consist of the mixture of water vapor and gas, which mixture is suitably passed through a dehumidifier. In addition or alternatively, heat exchangers, which are supplied with a liquid heat transfer fluid, may be provided between the core region of the compacted body and the outside peripheral surface of said body. Adjacent to the core region of said body said heat exchangers may be attached, e.g., to an exhaust shaft. In order to avoid a charring of the wood chips in a mixture which contains an excessively high proportion of fermentable green plant material or if the fermentation is effected at a relatively high rate, the temperature of the compacted body may be monitored and a temperature rise above about 85° C. may be prevented by a cooling action. Cooling may be effected by means of external heat exchangers and the surplus heat may be used to heat water or for other heating purposes. If two or more fermentation spaces are arranged one beside the other or one above the other and are supplied with the mixture of wood chips and fermentable green part material during periods of time which are offset from each other, said heat exchangers may be used for a transfer of heat from one or more compacted bodies which are in a state of intense fermentation to other compacted bodies in order to heat the same to the initial fermentation temperature. The drying process in a given compacted body will substantially have been completed if the drying temperature remains relatively constant for a predetermined period of time, which will depend on the size of said compacted body and the rate at which water vapor can be exhausted therefrom. After that period the compacted body may quickly be cooled by means of externally disposed heat exchangers and the heat which is thus recovered may be utilized.

DETAILED DESCRIPTION OF THE PREFERRED EMBODIMENTS

Preferred embodiments of plants for carrying out the process in accordance with the invention and examples of such process will now be described more in detail.

Figure 1:
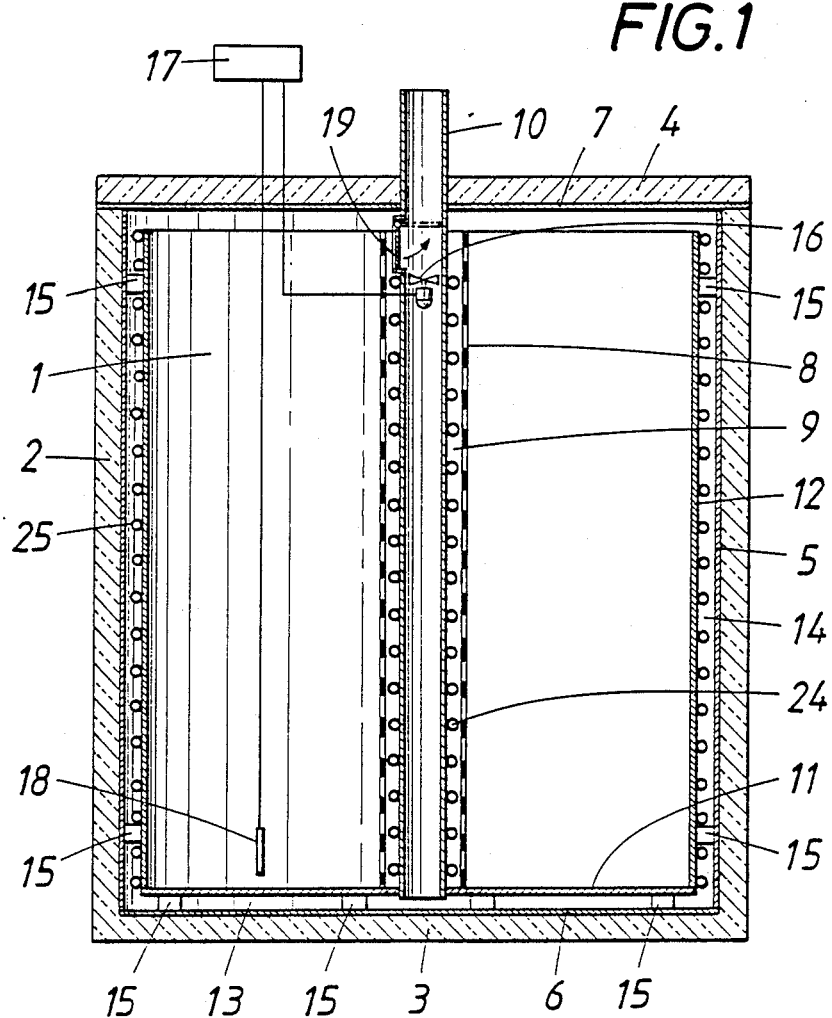
FIG. 1 is a diagrammatic longitudinal sectional view showing an embodiment of a plant for carrying out the process in accordance with the invention and FIG. 2 is a diagrammatic top plan view showing another embodiment of such plant.

The plant shown in FIG. 1 comprises a container, which has side walls 2, a bottom 3 and a top 4, which enclose a cylindrical or prismatic holding space 1. The parts 2, 3 and 4 may consist of concrete, which may be provided with a corrosion-resisting coating, or may constitute parts of a metal or plastic structure. The top 4 may be provided with one or more charging openings, which are not shown and may be closed by covers. One of the side walls 2 may be provided with an extraction door. In the embodiment shown the side walls 2, the bottom 3 and the top 4 are provided on their inside surfaces with a heat-insulating lining 5, 6 and 7, respectively. A metal or plastic structure may alternatively be provided with heat insulation on the outside.

An exhaust shaft 9 made of perforated material, such as metal wire mesh 8, is disposed at the center of the holding space 1 and contains a pipe 10. Flow passage gaps 13, 14 are defined between the bottom insulation 6 and the underside of a compacted body which lies on an intermediate bottom 11 and between a shell 12 of corrosion-resisting material surrounding the outside peripheral surface of the compacted body and the heat insulation 5 on the side walls 2. In the embodiment shown, the parts 11, 12 are supported by spacers 15. Alternatively, exhaust pipes or shafts in a starlike configuration may be provided on the bottom 3 and may extend to the shaft 9 and said pipes may merge into shafts along the side walls 2.

The exhaust pipe 10 contains a fan 16, which is controlled by a control unit 17. That control unit is controlled by one or more temperature sensors 18, which are disposed in the compacted body and/or in the flow passage gaps 13, 14 or in the equivalent shafts. When the compacted body has been formed in the holding space 1 and the fermentation has been initiated, a damper 19 which is initially in a position in which the damper closes a lateral opening in the pipe 10 is moved to the position which is shown in phantom and in which the damper 19 closes the pipe 10 near its outlet end. When the fan 16 is then started the mixture of gas and water vapor which have been evolved during the fermentation is circulated under the top 4, through the gaps 13, 14, through the shaft 9 and through the portion of the pipe 10 under the damper 19. That circulation results in a heat exchange between the core region and the periphery of the compacted body in the holding space 1. The mixture being circulated may be passed through a dehumidifier, which is attached to the pipe 10 at its lower end or is constituted by cooling surfaces which have been inserted in certain regions of the insulation 6, 5, and the moisture which has been collected may be withdrawn to the outside. In addition, heat exchangers supplied with a liquid heat transfer fluid are provided for an improved heat transfer between the core region and the periphery of the body of compacted mixture. Those heat exchangers are represented in the drawing by pipes 24, 25 and their function will be described more in detail with reference to FIG. 2. The mixture of water vapor and gas can be blown out when the damper 19 has been opened under the control of the control unit 17.

Figure 2:
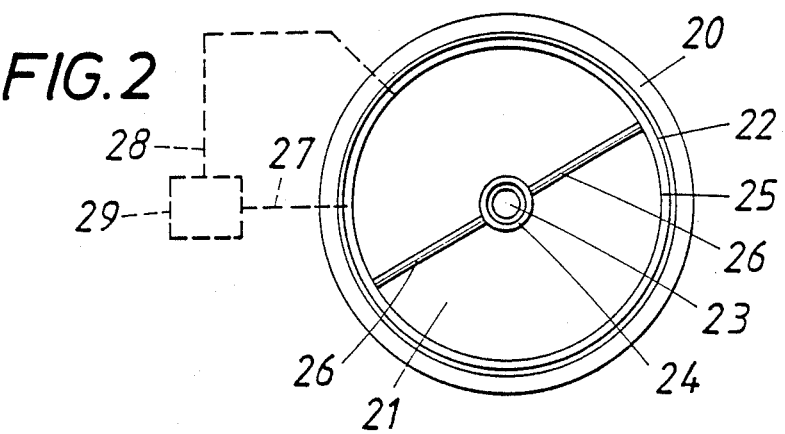

In the embodiment shown in FIG. 2 a holding space 21 is enclosed by a cylindrical outer shell 20. The top and bottom walls defining the space 21 are not shown. The shell, bottom and top walls are provided with heat insulation 22. The holding space 21 may be surrounded by a structure which is similar to that provided in a tower silo for processing feed and existing silos of that kind may be provided with heat insulation and suitable internal fixtures to form a holding space for carrying out the process in accordance with the invention. A central shaft 23 is surrounded by tubes or radiators 24 of a heat exchanger and defines flow passage gaps therewith, which permit an escape of gas and water vapor. Corresponding heat exchanger elements 25 are arranged in a jacket space surrounding the compacted body in the holding space 21. Upper and lower connecting pipes 26 may be provided for conducting a heat transfer fluid preferably consisting of a liquid so that a temperature equalization between the core region and the outer periphery of the compacted body in the holding space 21 will be effected. That fluid may be subjected to a forced circulation, if desired. As is indicated by dotted lines the heat exchangers 24 to 26 may be connected by lines 27, 28 to an external cooling or heating circuit 29. An external heating circuit may be used for a quick heating of a bottom layer of the compacted body to a fermentation temperature of about 40° C. and an external cooling circuit 29 may be operated when the temperature of the compacted body tends to rise above a preselected upper limit. In the latter case the extracted heat may be used for water heating or for room heating or for a heating of a compacted body in a fermenting space in another container, which is operated in parallel and in which the compacted body is in an initial state of fermentation. Particularly in the jacket space 25 the heat exchanger may be divided into a plurality of superimposed sections, which may be operated and shut down in a controlled manner so that the heating of the peripheral regions of the compacted body in different height zones can be controlled.

EXAMPLE 1

Birches were felled early in October. The waste wood which was obtained and consisted of the branches and the twigs connected thereto as well as of the leaves on said twigs was immediately comminuted in a chopping machine to form chips having major dimensions between 2 and 35 mm. Said chips were charged from above into a holding space, which could be walked in through an airtightly closing armored door. The holding space had the basic configuration of a square having side lengths of 5.6 meters and had a height of 4.30 meters and was provided with a square charging opening having a side length of 1.60 meters. The chips were distributed on the bottom to form layers and were compacted by being trampled as they were distributed. At the end of the felling and the succeeding chopping early in November the holding space contained a compacted body of about 120 m$^3$. The proportion of the fermentable green plant material amounted to about 10% by weight and the average moisture content of the compacted body amounted to about 60% by weight. The above-mentioned armored door was closed. An exhaust shaft consisting of perforated boards was installed at the center of the compacted body. Because the outdoor temperatures were relatively low, water vapor escaped at the charging opening and through the exhaust shaft and was well visible as a veil of haze. The water which was condensed at the top wall of the holding space was collected and drained by means of plastic films. A temperature rise of the compacted body to about 80° C. was observed. The rate of temperature rise was strongest during the first two weeks after all plant material had been charged. Six weeks after the charging of all plant material the armored door was opened. The wood chips which could now be extracted through said door had cooled down and contained 16 to 20% by weight moisture. An inspection of the wood chips revealed that they had no unpleasant odor and were not infested by molds or other fungi. As a result of the fermentation the wood chips had a slightly yellow to brown color. Part of the wood chips was combusted without difficulty and another part was loaded and sold as bulk fuel.

EXAMPLE 2

In smaller holding spaces, which were provided at the bottom and side walls with heat insulation, green alder wood which contained 10% fermentable green plant material was processed to form wood chips and bushwood was processed to form green wood chips which were similar to the woodchips which are produced from the wood obtained from wood-growing plantations. These green wood chips were dried in accordance with the same process and the drying was also completed after six weeks. In experimental work, mixtures consisting of equal parts by weight of green wood chips from broad-leaved woody plants and wood chips made from waste wood from coniferous woody plants were processed. In addition to the leaves connected to the wood from broad-leaved woody plants, fermentable green plant material obtained from broad-leaved plants and grasses was added so that the mixture contained 10% by weight of fermentable green plant material. In that case the heat which was generated by the fermentation of the fermentable green plant material was also sufficient for an adequate drying within six weeks.

After the fermentation and drying, the wood chips are accompanied by fermented plant material from which water has been removed and which may either be combusted together with the wood chips or, if wood chips having a high purity are required, may be removed from them by conventional mechanical separating operations.

I claim:

1. A process of producing dried wood chips from wood selected from the group consisting of wood from broad-leaved and coniferous woody plants, which comprises the steps of
   (a) chopping the wood in a green state to form green wood chips,
   (b) mixing the green wood chips with a comminuted, fermentable mass of green plant material selected from the group consisting of bark and leaves of broad-leaved woody plants, leaves of leaved plants, grass and mixtures thereof to form a mixture of the green wood chips and the green plant material,
   (c) compacting the mixture of the green wood chips and the green plant material in a holding space defined by sides and a bottom,
   (d) fermenting the compacted mixture in the holding space while maintaining the sides and the bottom thereof airtightly closed whereby passage of air through the compacted mixture is substantially prevented during fermentation and the fermentation generates heat and evolves water vapor and gases, and
   (e) causing the generated fermentation heat to dry the compacted mixture in the holding space while the sides and the bottom thereof are airtightly closed and said water vapor and gases are removed from the holding space.

2. The process of claim 1, wherein the holding space has a top and the top is airtightly closed whereby passage of air through the top into the compacted mixture during fermentation and drying is substantially prevented.

3. The process of claim 1, wherein the wood consists of wood from broad-leaved plants and the green plant material consists of bark and leaves of broad-leaved woody plants, and the mixture is fermented immediately after the wood has been chopped and the green plant material has been comminuted.

4. The process of claim 3, wherein the proportion of the green plant material in the mixture is less than 15%, by weight.

5. The process of claim 1, wherein the mixture has an average moisture content of up to 70%, by weight, and the proportion of the green plant material in the mixture is selected in dependence of the average moisture content of the green wood chips to produce said average moisture content of the mixture.

6. The process of claim 1, wherein the mixture has an average moisture content above 70%, by weight, and the proportion of the green plant material in the mixture is selected in dependence of the average moisture content of the green wood chips to produce said average moisture content of the mixture.

7. The process of claim 1, comprising the further step of heat-insulating the bottom and the sides of the holding space.

8. The process of claim 1, wherein the evolved water vapor and fermentation gases are removed from the holding space through a gas-permeable exhaust shaft arranged in the compacted mixture and having an outlet extending therefrom.

9. The process of claim 1, wherein the wood is chopped into green wood chips of different sizes having major dimensions of 2 mm to 35 mm.

10. The process of claim 1, wherein a bottom layer containing a higher proportion of the green plant material than the remainder of the compacted mixture is formed in the holding space during compaction of the mixture.

11. The process of claim 1, wherein a bottom layer containing only a fraction of the entire mass of the compacted mixture is formed in the holding space during compaction of the mixture and this bottom layer is heated by an external heat source of a fermentation temperature above 40° C. immediately after the bottom layer has been formed.

12. The process of claim 1, wherein partial quantities of the mixture of the green wood chips and the green plant material are supplied successively to a plurality of adjacent ones of said holding spaces, and any excessive fermentation heat from a respective one of the holding spaces wherein the compacted mixture is in full fermentation is transferred to the adjacent holding space for initiating fermentation therein.

13. The process of claim 1, comprising the further step of transferring a portion of the fermentation heat generated during drying in a core region of the compacted mixture to a peripheral region thereof.

14. The process of claim 1, comprising the further steps of monitoring the temperature of the compacted mixture during fermentation and drying, and cooling the compacted mixture in response to the monitored temperature to prevent a temperature rise above about 85° C.

* * * * *